No. 704,747. Patented July 15, 1902.
C. JOHNSON & O. C. RAWLEY.
FERTILIZER DISTRIBUTER.
(Application filed Feb. 20, 1902.)
(No Model.) 2 Sheets—Sheet 1.

Witnesses
Inventors
C. Johnson,
O. C. Rawley.

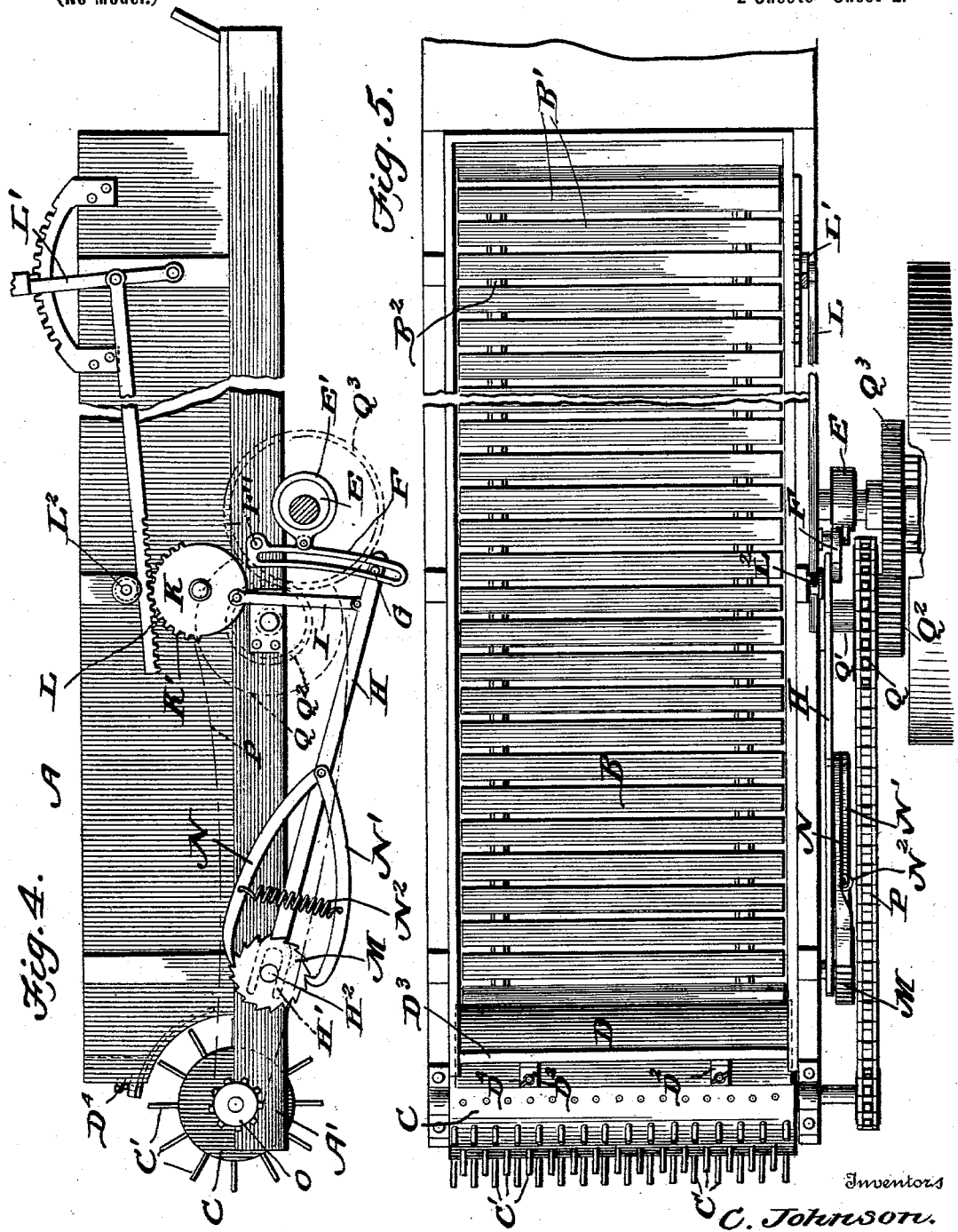

UNITED STATES PATENT OFFICE.

CHARLES JOHNSON AND OREN C. RAWLEY, OF NEWARK VALLEY, NEW YORK.

FERTILIZER-DISTRIBUTER.

SPECIFICATION forming part of Letters Patent No. 704,747, dated July 15, 1902.

Application filed February 20, 1902. Serial No. 94,966. (No model.)

*To all whom it may concern:*

Be it known that we, CHARLES JOHNSON and OREN C. RAWLEY, citizens of the United States, residing at Newark Valley, in the county of Tioga and State of New York, have invented a new and useful Fertilizer-Distributer, of which the following is a specification.

This invention is an improved construction of fertilizer-distributer, the object being to provide a simple and efficient construction whereby fertilizing material of any character whatever can be evenly distributed over a field without clogging the operative parts of the machine, and another object is to provide a fertilizer-distributer in which the distributing mechanism can be quickly and easily adjusted by the operation of a single lever, so that the rate of feed or distribution can be regulated, and this is accomplished while the machine is in operation.

With these objects in view the invention consists in the novel features of construction and combination, all of which will be fully described hereinafter and pointed out in the claims.

Figure 1:
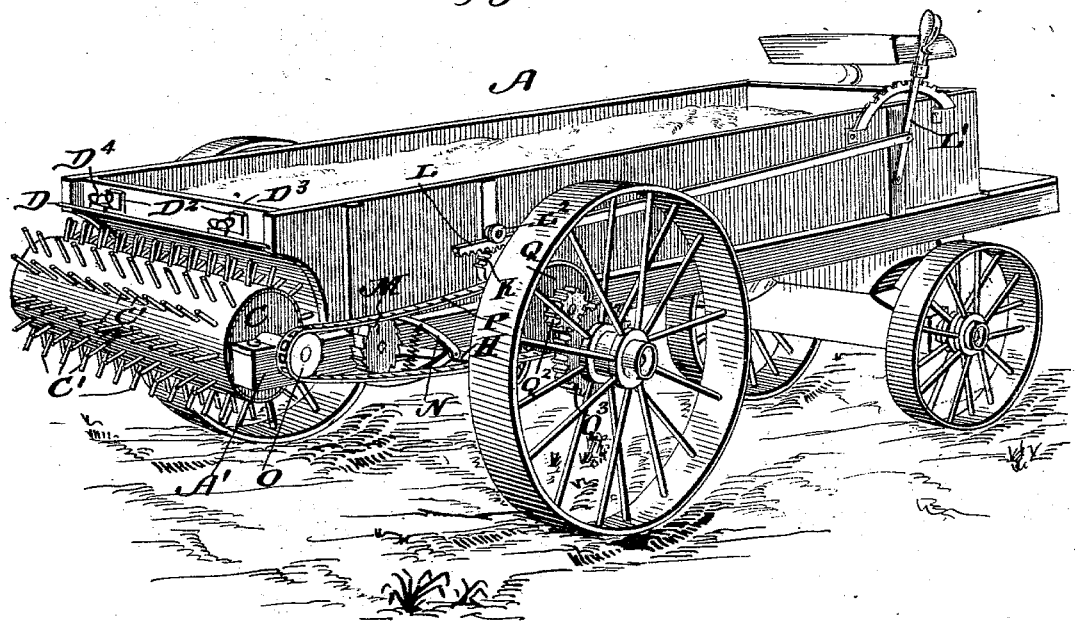
Figure 2:
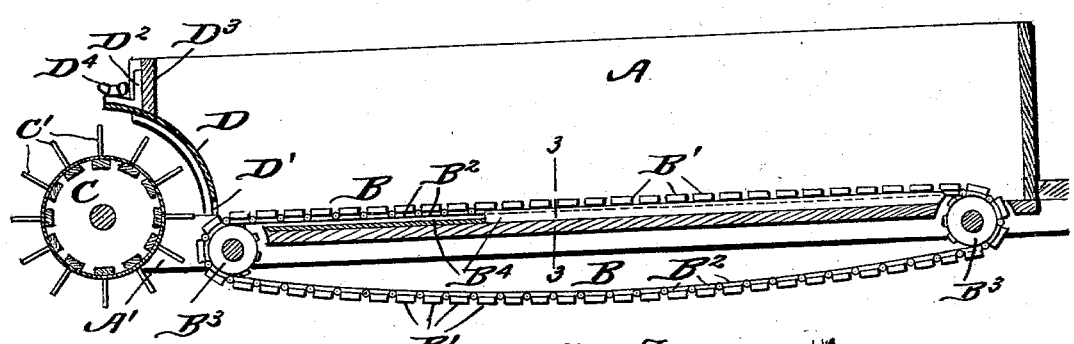
Figure 3:
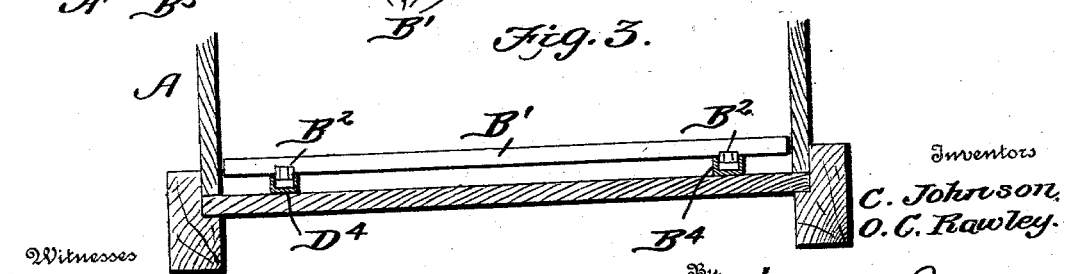

In the drawings forming part of this specification, Figure 1 is a perspective view illustrating a fertilizer-distributer constructed in accordance with our invention. Fig. 2 is a vertical longitudinal section showing the wagon-body, endless belt or apron, and distributing-drum. Fig. 3 is a section on the line 3 3 of Fig. 2. Fig. 4 is a side elevation of a wagon-body and showing the means for operating the feed and distributer mechanisms. Fig. 5 is a top plan view illustrating the feeding apron or belt, distributing-drum, and means for operating the said parts.

In carrying out our invention we employ a wagon-body A, which is suitably mounted upon a proper running-gear, the rear end of the body projecting a considerable distance beyond the rear axle of the machine, as most clearly shown in Figs. 1 and 4. The bottom of the wagon-body A is cut away at the front and rear ends to permit the operation of an endless belt or apron B, which is composed of a series of cross-slats B′, connected to the links B², said links traveling around and operated by sprockets B³, mounted upon the shafts, journaled in the sills of the wagon-body. Channel-bars B⁴ are arranged upon the bottom of the wagon-body and serve as guides for the links or chains of the endless belt or apron. The sills of the wagon-body are extended a short distance beyond the end-gate, as shown at A′ in Figs. 1 and 4, and journaled between the projecting ends is a distributing-drum C, the surface of which is provided with a series of spikes or fingers C′, and it will be noted that the center of said drum or cylinder is in alinement with the upper flight of the feed apron or belt. The end-gate D is curved upon the arc of a circle, as indicated, and slides in guideways D′, produced in the sides of the wagon-body, and by sliding the said end-gate up or down the size of the opening at the rear end of the wagon-body can be increased or decreased, thereby permitting a larger or smaller quantity of fertilizer to be fed from the wagon-body. Brackets D² are attached to the cross-strip D³ above the sliding end-gate, said brackets having set-screws D⁴ passing therethrough and binding against the upwardly-projecting portion of the end-gate, so that the said end-gate can be locked in any adjusted position. By having the distributing-drum arranged with its center on a line with the upper flight of the feed apron or belt an even or uniform distribution of the fertilizer is obtained and all clogging of the parts entirely avoided.

In order to operate the feed belt or apron uniformly and also to provide for the regulation of such movement, we have devised an improved form of operating mechanism in which we employ an eccentric E, which is mounted upon the rear axle of the wagon, said eccentric being surrounded by a strap E′, to which is pivotally connected a link F, said link being pivoted at F′ to the sill of the wagon-body, and sliding in the said link is the pin G, carried upon the forward end of the rod H, said rod being suspended by means of a bar I, which is pivotally connected at its upper end to a disk K, the upper edge of which is provided with rack-teeth K′, adapted for engagement with the rack-bar L, said bar being operated by means of the hand-lever L′; a guide-roller L² holding the rack-bar in engagement with the rack-teeth disk K, and it will be understood that by shifting the lever L' the disk K is turned, so that the rod H is raised or lowered, and inasmuch as the link is pivotally connected to the straps surrounding the eccentric the throw of the said rod will be regulated. The rear end of the rod H is bifurcated, as shown at H', and works upon the projecting end of the rear sprocket-shaft H², and mounted upon the end of said shaft is a ratchet-wheel M, and pivotally connected to the bar H are the pawls N and N', which engage the ratchet-wheel M and are held in such engagement by means of the spring N², connecting said pawls; and it will be noted that the pawl N engages the upper side of the ratchet-wheel and that the pawl N' engages the lower side thereof and is hooked at its end, so that upon the rear stroke of the rod H the pawl N will operate and upon the forward stroke the pawl N' will operate, so that a continuous rotary motion is imparted to the rear sprocket-shaft, and in this manner the endless feeding belt or apron is moved continuously in a rearward direction, thereby feeding the fertilizer out through the opening to the distributing drum or cylinder, and by operating the hand-lever the operating mechanism can be regulated so that the amount of fertilizer to be distributed can be regulated with accuracy. One end of the distributing-drum shaft projects beyond the sill and is provided with a sprocket-wheel O, around which travels a drive-chain P, said chain passing around a sprocket Q, which is mounted upon a shaft Q', carrying a gear Q², which meshes with another gear Q³, mounted upon the rear axle of the wagon, so that as the wagon is being driven forward and the feeding mechanism operated the drum will be rotated to distribute the fertilizer fed thereto by the apron or belt. A suitable clutch or pawl-and-ratchet mechanism (not shown) is arranged in the hub of the rear axle, so that the operating mechanisms will only be operated during the forward movement of the wagon.

It will thus be seen that we provide a simple, efficient, and durable construction of fertilizer-distributer and one in which an even and uniform feed and distribution can be had and also one in which the amount of fertilizer to be distributed can be quickly and easily regulated while the machine is in operation.

Having thus fully described our invention, what we claim as new, and desire to secure by Letters Patent of the United States, is—

1. In a fertilizer-distributer, the combination with a wagon-body, of an endless feed-belt, an adjustable tail-gate, a distributing-drum in proximity to said tail-gate, means for rotating said drum, an eccentric mounted on the axle-shaft, a pivoted lever connected with said eccentric, and means connected with said lever for imparting rotation to said endless belt, substantially as described.

2. In a fertilizer-distributer, the combination with a wagon-body, of an endless feed-belt, an adjustable tail-gate, a distributing-drum in proximity to said tail-gate, means for rotating said drum, an eccentric mounted on the axle-shaft, a pivoted lever connected with said eccentric, a reciprocatory bar, connected to said lever for imparting rotation to said endless belt, substantially as described.

3. In a fertilizer-distributer, the combination with a wagon-body, of an endless feed-belt, a distributing-drum, means for rotating said drum, an eccentric mounted on the axle-shaft, a pivoted lever connected with said eccentric, a reciprocatory bar connected to said lever for imparting movement to said endless belt, and means controlled by the driver at his seat for limiting the movement of said reciprocatory bar whereby to regulate the speed of said endless belt, substantially as described.

4. In a fertilizer-distributer, the combination with a wagon-body, of rollers journaled in said wagon-body and an endless belt traveling around said rollers, a distributing-drum, a sprocket mounted on the axle-shaft and a chain connection between said sprocket, and a sprocket on said drum, an eccentric also mounted on said axle-shaft, a pivoted slotted lever connected with said eccentric, a reciprocatory bar having a lug engaging in said slot in said lever, and spring-constrained pawls carried by said reciprocatory bar for engaging a ratchet-wheel on the shaft of one of the rollers carrying the endless belt whereby to impart rotation to said rollers and thence to the endless belt, substantially as described.

5. In a fertilizer-distributer, the combination with a wagon-body, of the curved end-gate working in curved guides in the sides of the wagon-body, means for securing the end-gate in its adjusted position, the endless feed-belt, means for regulating the speed thereof, and the distributing-drum substantially as and for the purpose specified.

6. In a fertilizer-distributer, the combination with a wagon-body, rollers carrying an endless belt journaled in said body, a distributing-drum adjacent to the delivery of said endless belt, a sprocket mounted on the axle-shaft of said wagon, and a sprocket-chain passing around said sprocket and a sprocket on said distributing-drum, an eccentric also mounted on said axle-shaft, a strap on said eccentric, a slotted lever pivoted to the wagon-body and to said eccentric-strap, a reciprocatory bar having a lug engaging in said slot in said lever, pawls pivoted on said bar for rotating a ratchet-wheel on the shaft of one of the said rollers carrying the endless belt, a disk pivoted to said wagon having a strap connected with said reciprocatory bar, and a toothed periphery and a rack for rotating said disk whereby to limit the throw of said reciprocatory rod, and thereby the speed of said endless belt, substantially as described.

7. In a fertilizer-distributer, the combination with a suitable wagon, of an endless traveling belt, an eccentric mounted on an axle-shaft of said wagon, a slotted link pivoted to said eccentric, a reciprocating rod, one end of which is adapted to work in said slot, a ratchet-wheel secured at the other end of said rod, pawls pivoted to said rod and engaging opposite sides of said ratchet-wheel, a spring for holding said pawls in engagement with said ratchet-wheel, means for changing the throw of said rod, and means whereby rotation of the ratchet-wheel imparts movement to the belt.

CHARLES JOHNSON.
OREN C. RAWLEY.

Witnesses:
GEORGE E. MIX,
JOHN W. BELCHER.